WITNESSES:
Wm F Hoy
N. Lewis Bogan

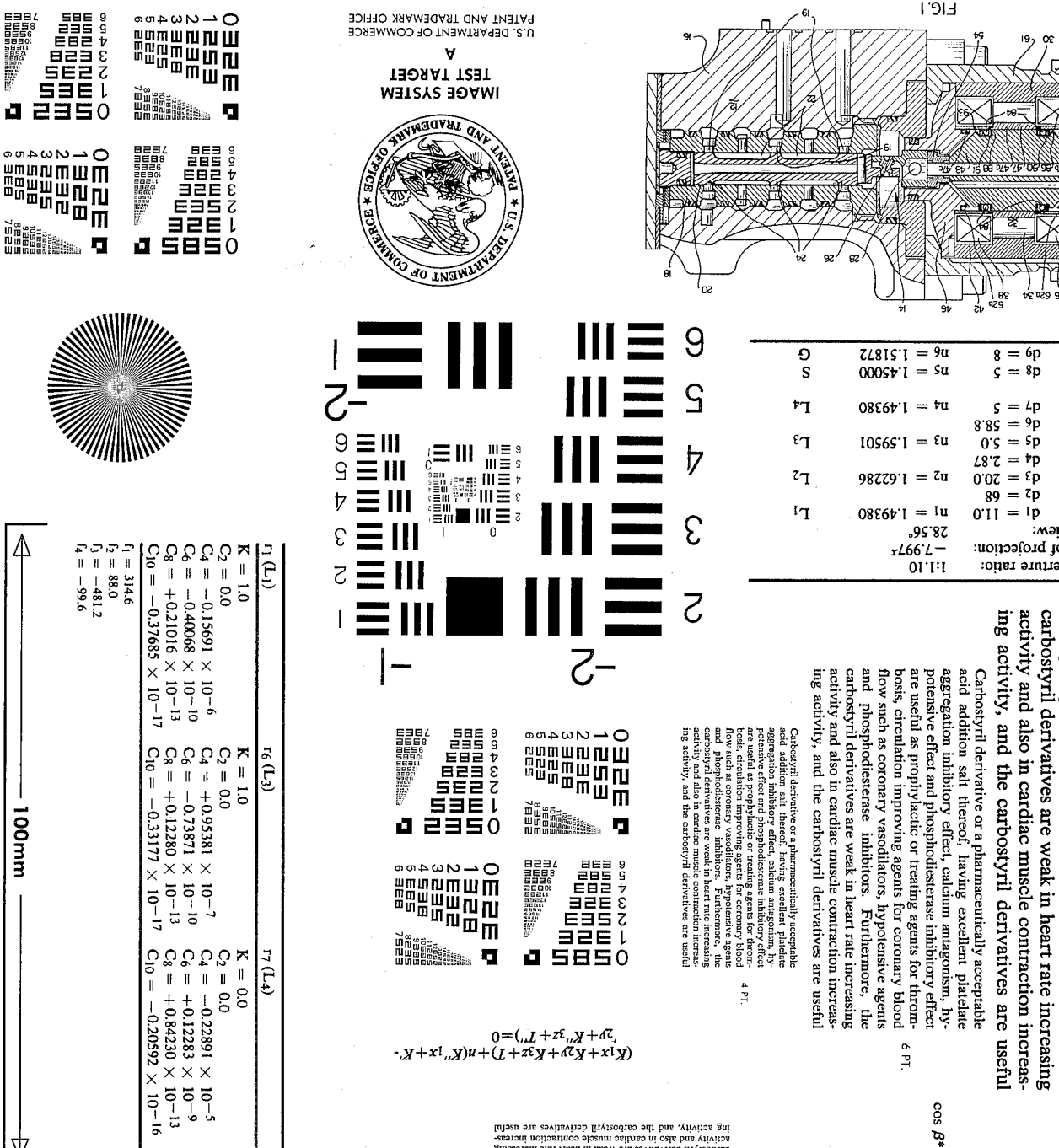

INVENTOR
Orry R Milliron
BY H.C. Everitt
Attorneys

UNITED STATES PATENT OFFICE.

ORRY R. MILLIRON, OF YOUNGWOOD, PENNSYLVANIA, ASSIGNOR OF ONE-HALF TO CHARLES B. SHEPLER, OF GREENSBURG, PENNSYLVANIA.

OPERATING MEANS FOR SIGNAL-LANTERNS.

No. 928,208.  Specification of Letters Patent.  Patented July 13, 1909.

Application filed February 23, 1909. Serial No. 479,416.

*To all whom it may concern:*

Be it known that I, ORRY R. MILLIRON, a citizen of the United States of America, residing at Youngwood, in the county of Westmoreland and State of Pennsylvania, have invented certain new and useful Improvements in Operating Means for Signal-Lanterns, of which the following is a specification, reference being had therein to the accompanying drawing.

This invention relates to certain new and useful improvements in signaling apparatus, and the invention relates more particularly to that class of signals which are generally known in railroading as "markers", this term being applied to signal lanterns which are attached to the rear end of an engine, car or train.

The invention has particular relation to the signal lanterns or markers which are attached to the rear of a locomotive tender, and in the art of railroading, these signals or markers are adapted to display a colored light to the rear of the train, the color of the light displayed indicating upon what particular track the engine is traveling.

In railroading, it is required that if an engine displaying a marker at the rear thereof crosses over for any reason whatever from the track on which it is traveling, for instance from a passenger track to a freight track, that the light or marker be changed from that which was displayed to indicate that the engine was on the passenger track, to the color which indicates that the engine is now traveling on the freight track. At present, this changing of the light or marker is performed by the fireman, who is required to go to the rear of the tender, often having to crawl over a sheet of ice to reach that point, and owing to the position of the markers where they are attached to the tender, the fireman is required to use both hands in effecting a change of the lantern whereby to change the color of the light displayed. Such work is extremely hazardous, often resulting in loss of life, and further, it is oftentimes impossible to effect the required change until the engine has proceeded a considerable distance under a wrong signal light.

The main object of my invention is to provide means whereby these markers or lanterns may be either automatically shifted by the engineer from his seat so as to change the light displayed from one color to another, or which may be manually shifted at a point convenient to both the engineer and fireman.

It is a still further object of my invention to provide means whereby the engineer and fireman, or both, may readily determine whether the lanterns are lighted, and whether the particular colored light required is being displayed at the rear of the engine.

It is a still further object of my invention to provide means whereby the lamps may be actuated automatically, and under the control of the engineer, by means of air taken directly from the main reservoir with which railroad engines are now generally equipped, and to provide means whereby the air employed for each actuation of the lanterns or markers is gradually exhausted from the controlling cylinder, whereby when it is desired to actuate the lanterns or markers manually, no air resistance pressure will be offered to such manual operation.

Further objects of my invention will hereinafter more fully appear as the invention is described in detail, and in describing the said invention in detail, reference will be had to the accompanying drawings forming a part of this application and in which I have shown a practical embodiment of the invention, but desire it to be understood that various changes may be made in the practice of the invention without departing from the spirit thereof.

In the drawings; Figure 1 is a side elevation of an engine equipped with my device. Fig. 2 is a top plan view of the device as applied to a locomotive tender. Fig. 3 is a detail perspective view of the lantern supporting means. Fig. 4 is a similar view of a portion of a lantern, showing the bar which connects the lantern with the rotatable base carried by the support, and, Fig. 5 is a longitudinal sectional view of the air cylinder.

While in the illustration of my invention I have shown the same adapted for the operation of the usual markers or lamps which are required to be attached to the rear of the locomotive tender, yet I desire it to be understood that such illustration is merely one instance of the use of the invention, as it will be understood that the marker or lamp to be actuated may be on a caboose, coach, or other rolling stock equipment of a road.

In the illustration of the invention, 10 indicates the tender of a locomotive, at the rear of which is suspended the markers or lanterns 11. These markers or lanterns, in the present practice are supported from hangers connected with the rear end of the tender, and, in operation, it is necessary for the fireman to go to the rear of the tender, and partially turn the markers or lanterns so as to display a different colored light, when the change of lights is required. As heretofore stated, this operation is perilous, first because it is a dangerous task oftentimes for the fireman to reach the rear end of the tender, and secondly, because the markers or signal lamps are so supported that it requires the use of both hands of the fireman to change the same, incurring great liability of the fireman losing his balance and falling from the tender, perhaps with the loss of his life. In my invention, I use substantially the ordinary form of marker or lantern generally employed on most of the railroads at the present time, with the single exception that I provide means whereby the base of the lantern is detachably connected to a rotatable base, which base is adapted to be actuated by the air controlled means or the manual means heretofore referred to, so that when said base is actuated in either manner, the lantern will be given a partial rotation along with the said base so as to effect a change in the color of the light displayed. The said lanterns or markers are usually supported adjacent the rear corners of the tender, suitable brackets being employed for this purpose. In accordance with my invention, I provide a pair of uprights or standards 12 projecting above the top of the tender, and at their upper ends being preferably enlarged into partial circular form, these enlarged upper ends 14 constituting light shields for a purpose as will more fully appear hereinafter. The said standards or uprights may be secured to the tender in any desired or suitable manner, such as by rivets as shown, or by bolts and nuts if desired. As the uprights or standards which constitute a part of the supporting brackets for the lamps or markers are identical in construction, I will refer to but one in detail in the further description.

The upright or standard has a rearwardly extending supporting arm 15 on which is rotatably mounted a base 16 upon which the signal lamp or marker 11 is supported and to which it is detachably secured. It will be understood that the lantern or marker may be detachably secured to the base 16 in any desired or approved manner, the construction shown in the illustration embodying a pair of spaced clamp members 17 on the upper face of the rotatable base 16 and a cross bar 18 placed within the frusto-conical base of the lantern to be received between the spaced clamp members 17 so that when the base member 16 is rotated, the lantern or marker will be rotated therewith. The standard or upright is provided on its rear face with an open ended cleat or clamp 20, which receives the vertical rear bar of a lantern holder 21, the forwardly extending arms of which have circular clamp members at their outer ends which receive the upper and lower tubular portions of the lantern or marker, and when the lantern is partially rotated, the same rotates within these circular clamp members. This lantern holder is substantially of the same form as that used in the present practice of suspending these lanterns or markers from the rear end of the tender at the present time, and I make no claim to the particular form of this lantern holder, as it will be readily understood that the type shown herein, or any other type of holder in which the lantern may have a partial rotation, may be employed.

Eccentrically and pivotally connected to each lantern base is the outer end of a rod 22. Carried by the tender 10 is a rock-shaft 23. This rock-shaft may have its ends journaled in the side walls of the tender, or the same may be supported by bearings 24, or the rock-shaft may be mounted both in the tender side walls and in said bearings. The rock-shaft has a depending arm near each end. The arm 25 near one end of the shaft is bifurcated at its lower end, and is connected to the inner end of the corresponding rod 22; the arm 26 near the opposite end of the rock-shaft is provided with a double bifurcation at its lower end, the inner end of the corresponding rod 22 being engaged in one bifurcation, while the other bifurcation of said arm 26 receives the outer end of a lever or throw rod 27, which in the present instance is shown as being located adjacent the inner wall at one side of the tender. As the tender is often filled with coal to a point up on top of the water tank of such tender, it is preferable to extend the throw rod or lever 27 through a protecting tube or casing 28, which may be suitably secured to the side wall of the tank. The rod or lever 27 extends forwardly to a point near the forward end of the tender, where it is given a lateral bend as at 29, and the rod is then extended longitudinally to approximately the front end of the tender where it is provided with a suitable handle 30, by means of which the throw rod or lever 27 can be actuated, and the partial rotary movement required to alter the lanterns or markers imparted thereto.

So far as now described, it is to be noted that an operative device for manually actuating the lamps or markers has been described. Assuming, that the throw rod or lever 27 is actuated by the grip or handle 30, this rod will be moved longitudinally either rearwardly or forwardly according to the direction of pull, and the shaft 23 will be rocked, causing the arms 25, 26, thereof to either give a pull on or a push against the rods 22, causing the same to impart a partial rotary movement to the bases 16, so that the lamps in rotating with said bases will be shifted so as to change the color of the light displayed at the rear of the lamps. It is of course understood in this connection, that the glasses of the lanterns or markers are so arranged that when the lamp is shifted in one direction, a certain colored light is displayed to the rear of engine, and that when the reverse movement is imparted to the lamp, a different colored light is displayed at the rear, all of which is the common practice in railroading to-day. In order that the rod 22 may have sufficient lateral movement to effect the desired rotary movement of the lamp, the slots 31 in the tender are made of sufficient length to permit the rods to have such lateral movement as it is necessary to impart the rotary movement to the base 16.

The handle end of the throw rod or lever 27 is preferably passed through a casing 32, in which is a set screw 33 which may be turned in so as to engage with the handle portion of the rod or lever 27 and the throw rod or lever 27 thereby is locked in a fixed position if desired. The locking means herein shown and described is obviously but one form which may be employed, as it will be evident that any means for locking the throw rod or lever so as to hold the lanterns or markers in fixed position may be employed.

It is to be observed that one of the lenses or glasses of the lamp is always disposed opposite to the rear face of the shield 14, the latter being of a size which will effectually shut off a display of the light to a train moving in the opposite direction.

Obviously, when the lanterns or markers are supported at the rear of the tender and below the upper edge thereof, the tender effectually shuts off any display of a light to a train moving in the opposite direction. However, it frequently occurs that with the lantern or marker supported as is the present practice, the light becomes extinguished and the lantern being at a point where the same cannot be observed by either the engineer or the fireman, they are unaware that no light is displayed at the rear of the train. With the lantern or marker supported above the tender however, in accordance with my invention, the shield 14 shuts off the light to a train moving in the opposite direction, and each shield is provided with a small aperture 34, so located therein as to aline at some point with the lens or glass immediately in the rear thereof, so that both the engineer and the fireman may readily observe whether the light is burning or not, and owing to the smallness of the aperture required for this purpose, no light will be displayed to any oncoming train.

The same mechanism as so far described is employed in connection with the automatic actuating means which is within the control of the engineer, and a practical embodiment of which is herein shown and will now be described in detail.

In the illustration, 35 indicates the control cylinder which is herein shown as mounted upon the tender at one side and at the front thereof. The piston 36 in this cylinder 35 has its rod 37 connected to the laterally extending portion 29 of the throw rod or lever 27. The cylinder 35 is provided at a point approximately central of its length, on any desired side thereof with a vent or exhaust port 38, through which the air is exhausted for the piston moving in both directions, as will more fully appear in the operation of the air actuated device. Air is admitted to the respective ends of the cylinder 35 through pipes 39 and 40 respectively. These pipes extend to a suitable point at or near the bottom of the tender, where they are detachably connected with one end of flexible hose or coupling members 41, the other ends of said flexible hose or coupling members 41 being detachably connected to pipes 42, 43, which extend upwardly through the cab floor of the locomotive, and then down through such floor where they connect with the main reservoir 44. The extension of these pipes 42, 43, within the cab floor is only sufficient to bring them to a point convenient to the engineer, and at such point the said pipes are provided with control valves 45, 46, respectively, the valve 45 controlling the flow of air from air reservoir 44 through pipe 42 and pipe 40 into one end of the cylinder, and the valve 46 controlling the flow of air from main reservoir 44 through pipe 43 and pipe 39 into the opposite end of said cylinder. Obviously, by providing the flexible hose connections 41 between the pipes 39, 40, and 42, 43, such flexible connections or coupling members may be detached at either end, so as to leave them connected with the pipes 39, 40, or with the pipes 42, 43, as may be desired when the engine and its tender are uncoupled.

In the operation of the automatic air controlled device, we will assume that the valve 45 is in the pipe which controls the display of the green light, and that the valve 46 is in the pipe which controls the display of the red light. Assuming further that the red light is displayed, and owing to a train having passed from the track which is indicated by such red light on to a track which necessitates the display of a green light, the engineer by opening valve 45 allows sufficient air from the main reservoir 44 to pass through pipe 42, connection 41 thereof, and pipe 40 into the forward end of the cylinder 35 so as to shift the piston therein toward the rear end of the cylinder, and by reason of the piston rod 37 being connected to the portion 29 of the throw rod or lever, the latter is moved longitudinally so as to rock the shaft 23, and thereby impart movement to rod 22, shifting the base 16 so as to give a partial rotary movement to the lantern or marker and throw the red light out of display position and bring the green light into such display position. Obviously, to shift from the green to the red light, the air is admitted to the opposite end of the cylinder, the admission of such air being controlled by the valve 46 and valve 45 remaining closed. These valves 45 and 46 it will be obvious may be suitably designated in the cab, as for instance, "green" and "red" so as to avoid liability of error in operating the valves. Air being admitted to one end of the cylinder 35, the piston will be moved to the opposite end of such cylinder, and as soon as the piston 36 begins to pass exhaust port 38, the air in the cylinder 35 begins to exhaust, so that in a comparatively short space of time after the actuation of the lamps to move them in one direction, the cylinder is entirely free of air so that the reverse operation may be imparted to the piston. This provision of a normally empty air cylinder is of extreme importance, since it is noted that the manually operated means embodies the same throw lever as is employed in connection with the air actuated means. Consequently when it is desired to actuate the lamps or markers manually, it is to be observed that there is no air pressure in the cylinder 35 to resist such manual operation.

In the detailed description of the invention as above given, the several parts have been described with respect to the location wherein the same are shown in the drawings, but I desire it to be understood that the location and arrangement of the several parts of the lamp actuating mechanism here shown as on the top of the tender, and also the location of the air controlled cylinder 35 may be altered or changed as conditions may require, and it will of course be understood that the air connections between the air controlled cylinder 35 and the main reservoir 44 will be such as any particular conditions occurring in the practice of the invention may necessitate.

Having fully described my invention, what I claim as new and desire to secure by Letters Patent is:—

1. In a lantern actuating mechanism, a rotatably-mounted base, a lantern detachably-connected thereto to rotate with said base, a rock shaft, means connecting said shaft with said base, and means connected with the rock-shaft for actuating the same both manually and pneumatically to impart rotary movement to the lantern.

2. In combination, a signal lantern or marker adapted to display different colored lights, a rotatably-mounted base to which the lantern is detachably-connected, means for actuating the base, a support for the base, a lantern holder detachably-connected to the support and in which the lantern rotates, the said support having an enlarged upper end constituting a light shield and said light shield having a peep opening alining with the lantern lens.

3. In combination, a signal lantern or marker, having a plurality of lenses, a lantern support, said support having an enlarged upper end constituting a shield and said shield having a peep hole therein, a rotatable-base carried by the lantern support and to which the lantern is detachably connected, the said base being so disposed with relation to the shield of said support that one of the lenses of said lantern will aline with the peep hole in the shield after each actuation of the lantern, and means connected with the base for actuating the same to partially rotate the lantern.

4. In a signal lantern of the type described, a lantern support, a rotatable base carried thereby, a lantern hung from the support and detachably-connected to the base whereby the lantern rotates with the base, the said support having an opening at a point to aline with one of the lenses of said lantern, and means for actuating the base to impart partial rotation to the base and lamp.

5. In combination with a signal lantern or marker adapted to display different colored lights, a support therefor comprising an upright having a shield, said shield having a peep opening alining with the lamp lens, a hanger connecting the lantern with said upright, a rotatable base carried by the upright and to which the lantern is connected, and means for actuating said base to impart partial rotary movement to the lantern.

6. In combination, a stationary lantern support comprising an upright having an enlarged upper end constituting a shield and said shield having a peep-hole, a rearwardly extending arm carried by said upright, a rotatable-base carried by said arm, a signal lantern detachably connected to said base to rotate therewith, said signal lantern having a plurality of lenses one of which when the lantern is stationary lies directly in the rear of said shield and alines with said peep-hole, and means for actuating the base to partially rotate the lantern and bring different lenses thereof into display position.

7. In combination with a locomotive and tender therefor, a lantern support secured to the rear end of the tender and projecting above said tender and having a shield on its upper end, an arm carried by said support, a base rotatably-mounted on said arm, a lantern mounted on said base to rotate therewith and having a plurality of lenses, the said base being so disposed with respect to said shield that one of the lenses of said lantern lies directly in the rear of said shield when the lantern is stationary, a throw-rod mounted on the engine tender, mechanism connecting said throw-rod with the rotatable-base, an air cylinder on the tender, a piston therein having its rod connected to said throw-rod, air inlet pipes communicating with opposite ends of said cylinder, an air reservoir carried by the engine, air outlet pipes leading from said reservoir into and out of the engine cab and provided within said cab with controlling valves, and flexible connections between said air outlet pipes from the reservoir and air inlet pipes of the cylinder.

In testimony whereof I affix my signature in the presence of two witnesses.

ORRY R. MILLIRON.

Witnesses:
R. M. PARKER,
A. M. WILSON.